(12) United States Patent
Cheng

(10) Patent No.: US 9,696,699 B2
(45) Date of Patent: *Jul. 4, 2017

(54) SELF-ORGANIZING SENSING AND ACTUATION FOR AUTOMATIC CONTROL

(71) Applicant: GENERAL CYBERNATION GROUP, INC., Rancho Cordova, CA (US)

(72) Inventor: George Shu-Xing Cheng, Folsom, CA (US)

(73) Assignee: CYBOMEDICAL, INC., Rancho Cordova, CA (US)

( * ) Notice: Subject to any disclaimer, the term of this patent is extended or adjusted under 35 U.S.C. 154(b) by 469 days.

This patent is subject to a terminal disclaimer.

(21) Appl. No.: 14/082,059

(22) Filed: Nov. 15, 2013

(65) Prior Publication Data
US 2014/0136455 A1 May 15, 2014

Related U.S. Application Data

(60) Provisional application No. 61/727,045, filed on Nov. 15, 2012.

(51) Int. Cl.
*G05B 15/02* (2006.01)
*G05B 13/04* (2006.01)

(52) U.S. Cl.
CPC .......... *G05B 15/02* (2013.01); *G05B 13/048* (2013.01)

(58) Field of Classification Search
None
See application file for complete search history.

(56) References Cited

U.S. PATENT DOCUMENTS

| | | | | |
|---|---|---|---|---|
| 5,435,972 A * | 7/1995 | Daw | ..................... | B01J 8/1809 |
| | | | | 422/108 |
| 6,047,221 A * | 4/2000 | Piche | ................... | G05B 13/048 |
| | | | | 327/185 |
| 6,278,899 B1* | 8/2001 | Piche | ..................... | G05B 17/02 |
| | | | | 375/316 |
| 6,381,504 B1* | 4/2002 | Havener | ................ | G05B 17/02 |
| | | | | 700/28 |
| 2004/0249480 A1* | 12/2004 | Lefebvre | .................. | G05B 7/02 |
| | | | | 700/31 |

(Continued)

OTHER PUBLICATIONS

Weis et al, "Self-organizing and Self-stabilizing Role Assignment in Sensor/ Actuator Networks", OTM 2006, LNCS 4276, pp. 1807-1824, 2006, Springer-Verlag, Berlin, Heidelberg 2006.*

(Continued)

*Primary Examiner* — Ilya Traktovenko
(74) *Attorney, Agent, or Firm* — Donald E. Stout; Stout, Uxa & Buyan, LLP

(57) ABSTRACT

A Self-Organizing Process Control Architecture is introduced with a Sensing Layer, Control Layer, Actuation Layer, Process Layer, as well as Self-Organizing Sensors (SOS) and Self-Organizing Actuators (SOA). A Self-Organizing Sensor for a process variable with one or multiple input variables is disclosed. An artificial neural network (ANN) based dynamic modeling mechanism as part of the Self-Organizing Sensor is described. As a case example, a Self-Organizing Soft-Sensor for CFB Boiler Bed Height is presented. Also provided is a method to develop a Self-Organizing Sensor.

5 Claims, 7 Drawing Sheets

(56) References Cited

U.S. PATENT DOCUMENTS

| | | | | |
|---|---|---|---|---|
| 2006/0074501 A1* | 4/2006 | Hartman | ............... | G05B 13/027 700/29 |
| 2007/0028220 A1* | 2/2007 | Miller | ................ | G05B 23/0278 717/124 |
| 2007/0119349 A1* | 5/2007 | Widmer | ................. | F22B 35/00 110/185 |
| 2007/0119351 A1* | 5/2007 | Widmer | ................. | F22B 35/00 110/342 |
| 2007/0122757 A1* | 5/2007 | Widmer | ................. | F22B 35/00 431/42 |
| 2007/0156288 A1* | 7/2007 | Wroblewski | ......... | G05B 13/042 700/266 |
| 2007/0240648 A1* | 10/2007 | Badami | .................. | F01K 13/02 122/504 |
| 2007/0250215 A1* | 10/2007 | Jia | ........................ | G05B 13/048 700/274 |
| 2008/0125881 A1* | 5/2008 | Grott | .................... | G05B 13/021 700/31 |
| 2013/0122433 A1* | 5/2013 | Labbe | ....................... | F23N 5/00 431/12 |

OTHER PUBLICATIONS

Clare et al, "Self-Organizing Distributed Sensor Networks", SPIE Conference on Unattended Ground Sensor Technologies and Applications Orlando, Florida, Apr. 1999 SPIE vol. 3713.*

Tong et al, "Application of Multisensor Data Fusion Based on RBF Neural Networks for Drum Level Measurement", Proceedings or the 2006 IEEE Internation.al Conference on Mechatronics and Automation, Jun. 25-28, 2006, Luoyang, China.*

Tong et al, "A Study on Model of Multisensor Information Fusion and its Application", Proceedings of the Fifth International Conference on Machine Learning and Cybernetics, Dalian, Aug. 13-16, 2006.*

Wu et al, "The Application of BP Neural Network to Bed Temperature Control System of CFB Boiler", Published in: International Workshop on DIntelligent Sy stems and Applications, 2009, ISA 2009, date of Conference: May 23-24, 2009, pp. 1-4, Conference Location: Wuhan.*

* cited by examiner

SELF-ORGANIZING SENSING AND ACTUATION FOR AUTOMATIC CONTROL

This invention was made with government support under SBIR grant DE-SC0008235 awarded by the U.S. Department of Energy. The government has certain rights to the invention.

INVENTION

The subject of this patent relates to sensing, actuation, and automatic control of physical processes including industrial processes, equipment, facilities, buildings, devices, boilers, valve positioners, motion stages, drives, motors, turbines, compressors, engines, robotics, vehicles, and appliances.

In the foreseeable future, the energy needed to support our economic growth will continue to come mainly from coal, our nation's most abundant and lowest cost resource. The performance of coal-fired power plants is highly dependent on coordinated and integrated sensing, control, and actuation technologies and products.

The implementation of sensors and advanced controls in power systems can provide valuable methods to improve operational efficiency, reduce emissions, and lower operating costs. As new power generation technologies and systems mature, the plant that encompasses these systems will become inherently complex. The traditional process control architecture that includes a conventional process layer, sensing layer, control layer, and actuation layer would no longer be sufficient. In order to manage complexity, the process control architecture that supports the plant control systems need to evolve to manage complexity and optimize performance.

On the other hand, with the advent of information technology, sensor networks have been implemented in more and more industrial plants. Most "modern" sensors and actuators are equipped with Fieldbus, a digital network for the industrial environment, that can send and receive useful information throughout the network. However, much of the information from the sensor networks is not very well utilized due to various reasons.

This patent introduces a novel Self-Organizing Process Control Architecture based on distributed intelligence and self-organizing methodologies that can distribute and use the intelligence in the sensing and actuation levels to manage complexity and solve real process control problems. This Self-Organizing Process Control Architecture can enable distributed intelligence at all levels, and allow the sensing and actuation networks to function in a self-organizing manner. The Self-Organizing Process Control Architecture comprises a Sensing Layer, Control Layer, Actuation Layer, Process Layer, as well as one or more of Self-Organizing Sensors (SOS) and Self-Organizing Actuators (SOA). A Self-Organizing Sensor for a process variable with one or multiple input variables is disclosed. An artificial neural network (ANN) based dynamic modeling mechanism as part of the Self-Organizing Sensor is also described. As a case example, a Self-Organizing Soft-Sensor for CFB Boiler Bed Height is presented. At last, a method to develop a Self-Organizing Sensor is disclosed.

In this patent, the term "mechanism" is used to represent hardware, software, or any combination thereof. The term "process" is used to represent a physical system or process with inputs and outputs that have dynamic relationships. The term "sensor" is used to represent a sensing mechanism. The term "Soft-Sensor" is used to represent a sensing mechanism typically implemented in computer software. The term "Process Variable of Interest" is used to represent a process variable that is important to the control and operation of the process but is too difficult or costly to measure using conventional methods. The term "Target Variable" is used to represent the target value for the "Process Variable of Interest".

Without losing generality, all numerical values given in this patent are examples. Other values can be used without departing from the spirit or scope of the invention. The description of specific embodiments herein is for demonstration purposes and in no way limits the scope of this disclosure to exclude other not specially described embodiments of this invention.

DESCRIPTION

A. Traditional Process Control Architecture

Traditionally, automatic control is based on the concept of feedback. The essence of the feedback theory consists of three components: measurement, comparison, and correction. Measuring the quantity of the variable to be controlled, comparing it with the desired value, and using the error to correct the control action is the basic procedure of feedback automatic control.

Figure 1:
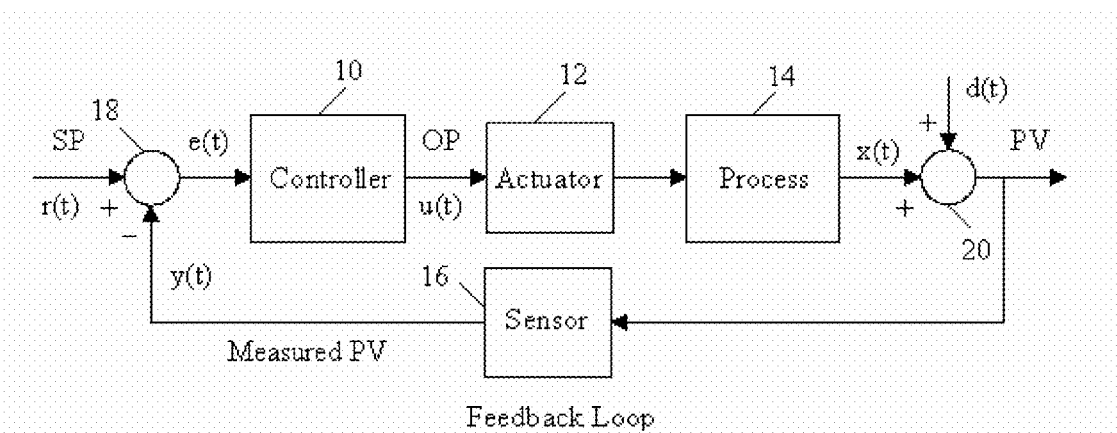
FIG. 1 is a block diagram illustrating a traditional single-loop automatic control system incorporating a sensor, controller, actuator, and process under control.

FIG. 1 is a block diagram illustrating a traditional single-loop automatic control system incorporating a Controller 10, an Actuator 12, Process 14, a Sensor 16, and Adders 18 and 20. The Sensor 16 measures the Process Variable (PV) to be controlled. The Measured Process Variable y(t) is compared at Adder 18 with the Setpoint (SP) signal r(t) to produce an error signal e(t), which is used as the input to the Controller 10. The control objective is for the Controller 10 to produce an output (OP) signal u(t) to drive the Actuator 12 to manipulate the Process 14 so that the Process Variable (PV) tracks the given trajectory of the Setpoint. The signals shown in FIG. 1 are as follows:

r(t)—Setpoint (SP),
PV—Process Variable, PV=x(t)+d(t),
y(t)—Measured Process Variable,
x(t)—Process Output,
u(t)—Controller Output (OP),
d(t)—Disturbance, the disturbance caused by noise or load changes,
e(t)—Error between the Setpoint and Measured Variable, e(t)=r(t)−y(t).

For simplification, the sensor and actuator are typically included as part of the process. Therefore, the Measured Process Variable y(t) can be considered the same as the Process Variable.

Figure 2:
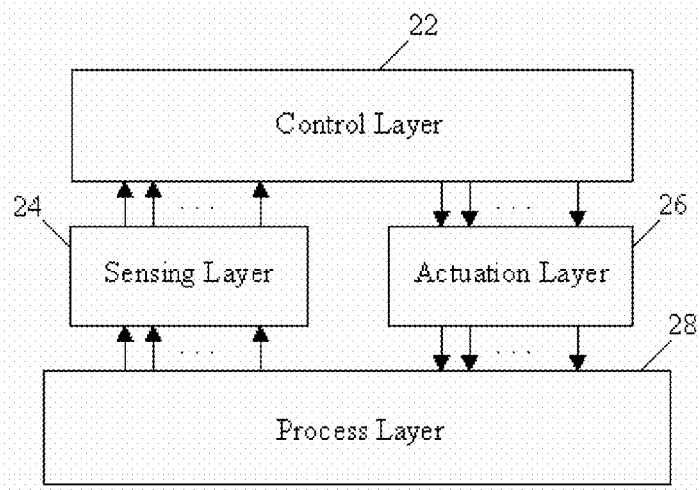
FIG. 2 is a block diagram illustrating a traditional process control architecture encompassing the Sensing Layer, Control Layer, Actuation Layer, and Process Layer.

FIG. 2 is a block diagram illustrating a traditional process control architecture encompassing the Control Layer 22, Sensing Layer 24, Actuation Layer 26, and Process Layer 28. Noting that both FIGS. 1 and 2 show the signals flow from the Process to Sensing, to Control, to Actuation, and then to Process in a loop. That is why a feedback control system is sometimes referred to as a control loop.

The Process Layer includes physical processes or systems with inputs and outputs that have dynamic relationships. For instance, a Circulating Fluidized-Bed (CFB) Boiler is a physical process that has multiple process variables to be controlled.

The Sensing Layer includes multiple sensors for measuring various process variables. These sensors can vary significantly in size, type, and physical characteristics. For instance, for a CFB boiler, Bed Temperature, Excess $O_2$, and Furnace Negative Pressure are typically measured.

The Control Layer includes multiple automatic controllers for controlling various process variables. The controllers are typically implemented in control devices such as Distributed Control Systems (DCS), Programmable Logic Controllers (PLC), Programmable Automation Controllers (PAC), Single-Loop Controllers (SLC), or computer software. The controllers include Inputs/Outputs (I/Os), communication buses, or digital networks to interface with sensors and actuators. The Setpoints are the target values for the process variables to track, which are entered, managed, and monitored in the Control Layer. The Control Layer usually includes a Graphical User Interface (GUI) for the operators to monitor the process and control system.

The Actuation Layer includes multiple actuators that take control command signals from the controllers and manipulate certain process inputs or manipulated variables. For instance, for a CFB boiler, Primary Air, Secondary Air, and Exhaust Air can be manipulated in order to control the Bed Temperature, Excess $O_2$, and Furnace Negative Pressure.

By way of comparison, a traditional process control architecture may possess the following properties:

1. Multiple sensors for measuring various process variables may exist. However, they send the measurement signals to the Control Layer only;

2. Multiple actuators for controlling different process variables may exist. However, they take commands from the Control Layer only; and 3. A sensor network may exist, but sensors do not talk to each other.

B. Self-Organizing Process Control Architecture

In regard now to the present invention, the following first reviews the concept of Distributed Intelligence, Self-Organizing, and other related terms in preparation for further discussions of the invention with reference in certain instances to FIGS. 3-10.

Distributed Intelligence

Distributed Intelligence can be considered an artificial intelligence method that includes distributed solutions for solving complex problems. It is closely related to Multi-Agent Systems.

Self-Organizing

Without using strict and academic type definitions, Self-Organizing can be understood as an organization that is achieved in a way that is parallel and distributed. Here, parallel means that all the elements act at the same time, and distributed means no element is a central coordinator.

Self-Organizing System

A self-organizing system is a complex system made up of small and simple units connected to each other and having self-organizing capabilities.

Figure 3:
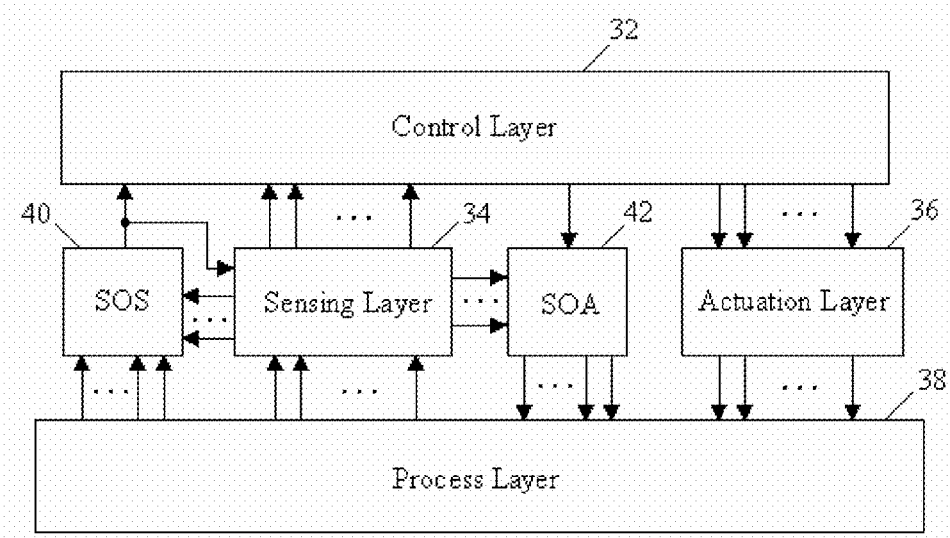
FIG. 3 is a block diagram illustrating a novel Self-Organizing Process Control Architecture comprising the Sensing Layer, Control Layer, Actuation Layer, Process Layer, as well as one or more of Self-Organizing Sensors (SOS) and Self-Organizing Actuators (SOA) according to an embodiment of this invention.

FIG. 3 is a block diagram illustrating a novel Self-Organizing Process Control Architecture comprising the Control Layer, Sensing Layer, Actuation Layer, Process Layer, as well as Self-Organizing Sensing (SOS) and/or Self-Organizing Actuation (SOA) components according to an embodiment of this invention. More specifically, the Self-Organizing Process Control Architecture not only comprises the Control Layer 32, Sensing Layer 34, Actuation Layer 36, Process Layer 38, but also one or more of Self-Organizing Sensors (SOS) 40, and Self-Organizing Actuators (SOA) 42.

Notice that the signal flows are not as simple as those of traditional feedback control loops. The Self-Organizing Sensors (SOS) and Self-Organizing Actuators (SOA) can have direct inputs from the sensor networks. The intelligence has not only been distributed in the sensing and actuation layers, but has also been utilized. The signal flows indicate that this architecture is beyond the scope of traditional control schemes.

This Self-Organizing Process Control Architecture can have one or more of the following properties:

1. A Self-Organizing Sensor (SOS) can have multiple inputs from the sensor network.

2. A Self-Organizing Sensor (SOS) can send its output to the sensor networks.

3. A Self-Organizing Actuator (SOA) can manipulate multiple manipulated variables in a coordinated way at the same time.

Potential key differences, one or more of which may exist between the traditional process control architecture and the Self-Organizing Process Control Architecture, are compared and summarized in Table 1.

TABLE 1

Comparison of Process Control Architectures

| No. | Common Property | Traditional Process Control Architecture | Self-Organizing Process Control Architecture |
|---|---|---|---|
| 1 | Multiple sensors for measuring various | Sensors send the measurement signals to the | Sensors may also send measurement signals to |

TABLE 1-continued

Comparison of Process Control Architectures

| No. | Common Property | Traditional Process Control Architecture | Self-Organizing Process Control Architecture |
|---|---|---|---|
|  | process variables may exist. | Control Layer only. | other sensors and actuators. |
| 2 | Multiple actuators for controlling different process variables may exist. | Actuators take commands from the Control Layer only. | A Self-Organizing Actuator (SOA) takes commands from the Controller and may have inputs from sensors. |
| 3 | A sensor network may exist. | Sensors do not talk to each other. | Sensors may talk to each other. |
| 4 | A sensor typically measures one physical property. | A sensor typically has only one or two inputs. | A Self-Organizing Sensor (SOS) can have multiple inputs from the sensor network. |
| 5 | N/A | An actuator typically manipulates one manipulated variable. | A Self-Organizing Actuator (SOA) can manipulate multiple variables in a coordinated way at the same time. |
| 6 | N/A | N/A | A Self-Organizing Sensor (SOS) can send its output to the sensor networks. |

C. Self-Organizing Sensor (SOS) for Circulating Fluidized-Bed (CFB) Boilers

To realize and describe the concept, properties, and significance of the Self-Organizing Process Control Architecture, a realistic sensing scenario is investigated in the context of an industrial process control, where conventional sensors do not work.

Circulating fluidized-bed (CFB) boilers are becoming strategic in power and energy generation. The unique design allows fuel such as coal powders to be fluidized in the air so that they have better contact with the surrounding air for better combustion. CFB boilers can burn low-grade materials such as waste coal, wood, and refuse derived fuel. More importantly, less emissions such as COx and NOx are produced compared to conventional boilers.

Figure 4:
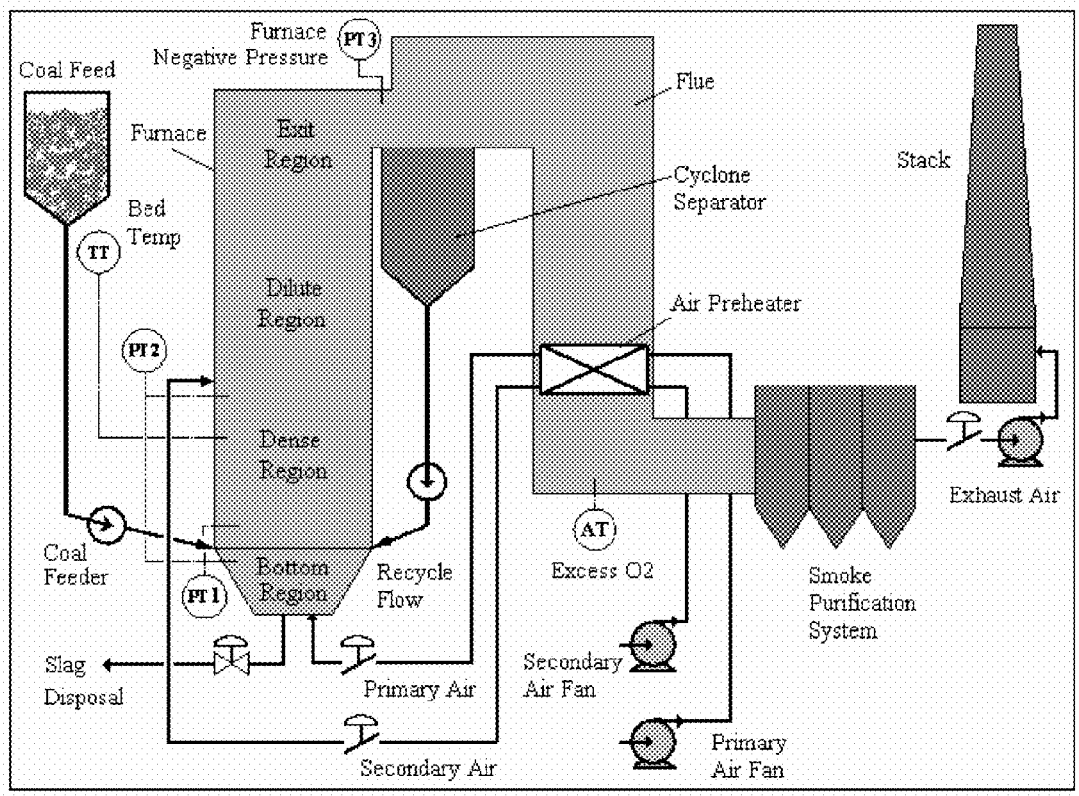
FIG. 4 is a schematic representation of the combustion process of a Circulating Fluidized-Bed (CFB) boiler.

FIG. 4 is a schematic representation of the combustion process of a Circulating Fluidized-Bed (CFB) boiler. Through the Coal Feeder, fuel is fed to the lower furnace where it is burned in an upward flow of combustion air. Unburned fuel and ash leaving the furnace are collected by the Cyclone Separator and returned to the lower furnace. Limestone is also fed to the lower furnace for emission reduction. Multiple fans and dampers are used to form the Primary Air, Secondary Air, and Exhaust Air as manipulated variables to achieve the following control objectives:

1. Hold the proper CFB circulating condition;
2. Keep the combustion fuel-air-ratio; and
3. Control the furnace negative pressure.

Since each manipulated variable can affect all three control objectives, this is a strongly coupled multivariable process.

In a CFB furnace, there are four regions based on the vertical distribution of solids, which can be coal or fuel powder. They are the Bottom Region, Dense Region, Dilute Region, and Exit Region. The Bed Thickness is a process variable representing the thickness or the height of the Dense Region.

Since the Dense Region has the highest heat transfer efficiency through direct contact to the furnace wall, it is important to run the CFB furnace at an optimal Bed Thickness. If the fluidized bed is too thin, the heat transfer efficiency is low. If the fluidized bed is too thick, it cannot hold-up. So, it is desirable to run the CFB furnace at the maximum Bed Thickness possible, while not causing other operating condition problems such as a fuel-air ratio mismatch. An appropriate amount of air and pressure is required to establish the fluidized bed and maintain an optimal fuel-air ratio at the same time.

This, indeed, can be a very complex problem, where the industry still does not have good answers. Typically, plants run a trial-and-error based operation, and the Bed Thickness is fixed at a relatively conservative and safe position. This results in low efficiency and potential CFB furnace shutdowns if the fuel type and size suddenly change. Automatic control of Bed Thickness is very important for the new generation of CFB boilers, especially Supercritical CFB boilers. However, this not only presents a control issue; but also a measurement problem. To conclude, the CFB Boiler Bed Thickness is difficult to measure yet it is a Process Variable of Interest. As defined at the beginning of this document, the term "Process Variable of Interest" is used to represent a process variable that is important to the control and operation of the process but is too difficult or costly to measure using conventional methods.

CFB Boiler Bed Height Steady-State Model

From an automatic control point of view, controlling the Bed Height or Bed Thickness should achieve similar results. Therefore, a feature of the invention can provide simplification to the design by developing a CFB Bed Height Soft-Sensor instead of a CFB Bed Thickness Soft-Sensor.

From a material balance point of view, Bed Thickness is related to the actual fuel amount or fuel density. For a coal-fired CFB boiler, fuel is mainly composed of coal powder. Since the fluidized bed varies, the actual Bed Thickness of a CFB boiler can only be a rough estimate. On the other hand, the pressure differential between the top and bottom of the fuel can be used as a key variable. This is defined as Bed Thickness Pressure Differential, $PT_B$.

In the fluidized condition, the Bed Thickness Pressure Differential, $PT_B$, is representative of the fuel height. In addition, $PT_B$ is proportional to the weight of the fuel lifted, which can be described as $$PT_B = K*H_S(t) + PT_0, \tag{1}$$

where
$PT_B$ is the Bed Thickness Pressure Differential,
$H_S(t)$ is the Bed Height in the Steady-State Condition,
K is a constant that is related to the CFB and coal grade, etc.,
$PT_0$ is the Bed Thickness Pressure Differential when CFB is idle.

Equation (1) can also be written as $$H_S(t) = a_1 * PT_B + H_0, \quad (2)$$

where
$H_0$ is the Bed Height at $PT_B=0$, which can be estimated in the idle or steady-state condition of the CFB boiler through experimentation.

$a_1=1/K$ is a constant that can be found in the steady-state through experimentation. Although $PT_B$ cannot be measured, it can be calculated based on the following formula:

$$PT_B = PT_2 - PT_1, \quad (3)$$

where
$PT_1$ is the pressure differential of the CFB furnace bottom damper, it is called Damper Delta P for short, and
$PT_2$ is the pressure differential between the bottom and top of the CFB furnace, it is called Furnace Delta P for short.

Reference is made to FIG. 4 for the actual locations of $PT_1$ and $PT_2$. Notice that $PT_1$ can be measured when there is no fuel in the CFB furnace at different Primary Air ($F_P$) operating points.

Figure 5:
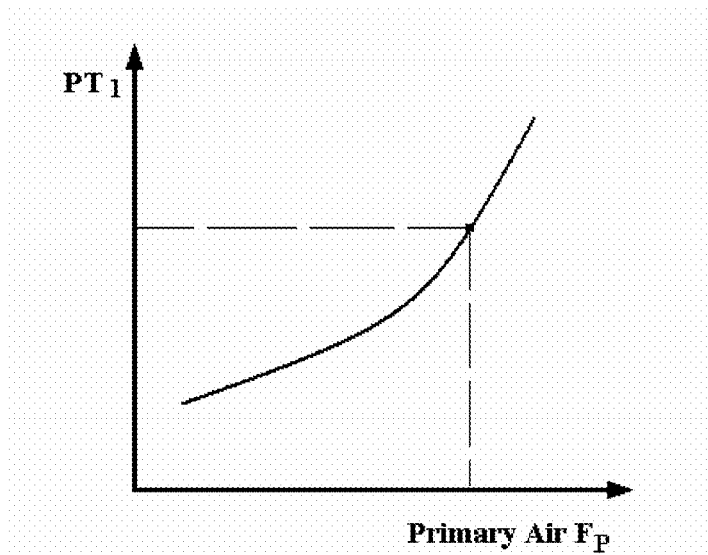
FIG. 5 is a diagram illustrating the relationship between the Primary Air and Damper Delta P of a CFB boiler according to an embodiment of this invention.

FIG. 5 is a diagram illustrating the relationship between the Primary Air $F_P$ and Damper Delta P of a CFB boiler. As shown in FIG. 5, the relationship between $PT_1$ and $F_P$ is typically nonlinear.

Figure 6:
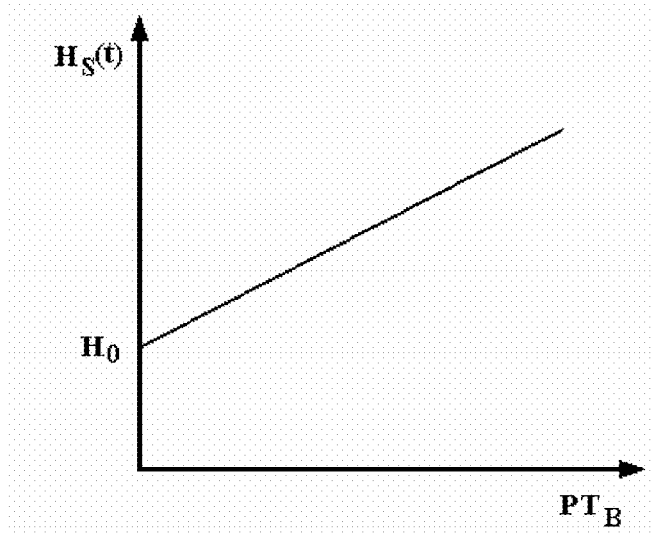
FIG. 6 is a diagram illustrating the relationship between the Bed Thickness Pressure Differential and Bed Height in Steady-State Condition in a CFB boiler according to an embodiment of this invention.

FIG. 6 is a diagram illustrating the relationship between the Bed Thickness Pressure Differential and Bed Height in Steady-State Condition in a CFB boiler. Since $PT_2$ is measurable during normal operations, $PT_B$ can be calculated. In this way, the steady-state CFB Bed Height $H_S(t)$ can be calculated based on the following formula.

$$H_S(t) = a_1 * (PT_2 - PT_1) + H_0. \quad (4)$$

Self-Organizing Soft-Sensor for CFB Boiler Bed Height

Figure 7:
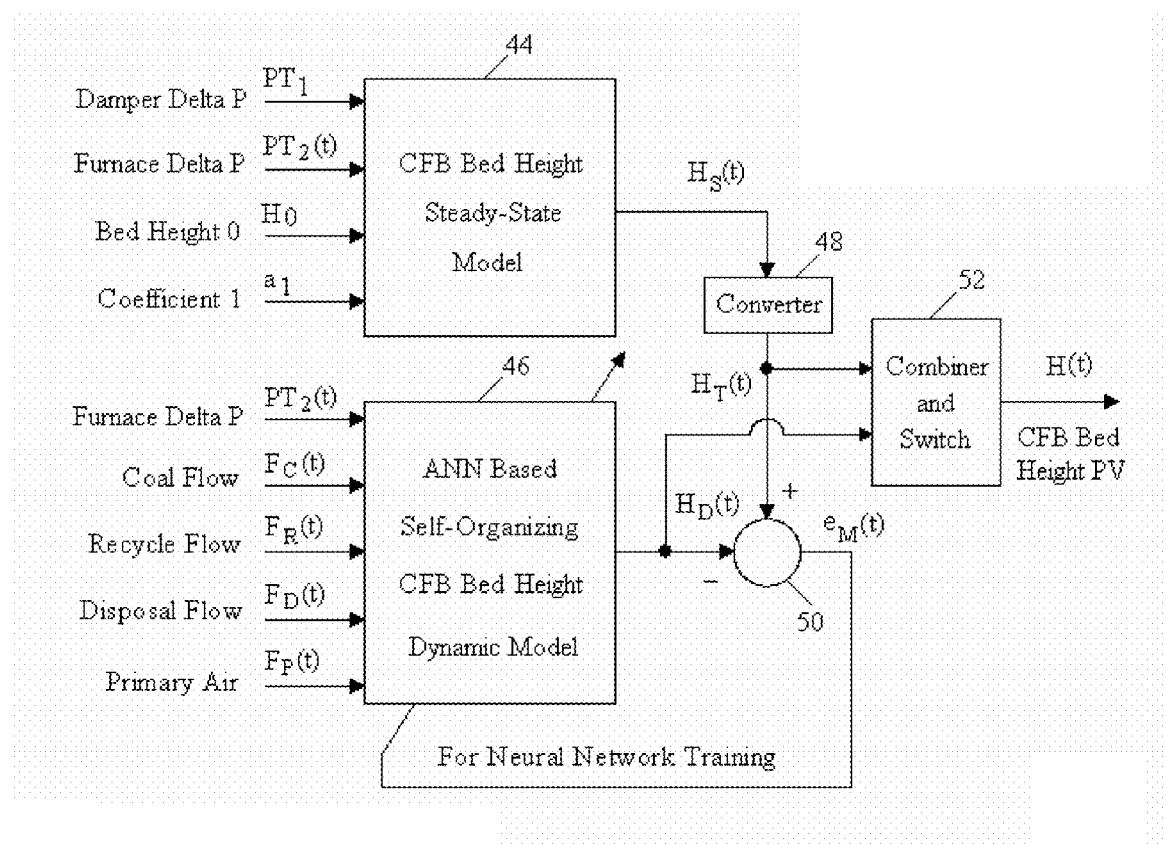
FIG. 7 is a block diagram illustrating a Self-Organizing Soft-Sensor for CFB Boiler Bed Height according to an embodiment of this invention.

FIG. 7 is a block diagram illustrating a Self-Organizing Soft-Sensor for CFB Boiler Bed Height according to an embodiment of this invention. The Soft-Sensor comprises a CFB Bed Height Steady-State Model 44, an ANN-Based Self-Organizing CFB Bed Height Dynamic Model 46, a Converter 48, an Adder 50, and a Combiner and Switch 52.

The CFB Bed Height Steady-State Model 44 produces the Steady-State Bed Height $H_S(t)$ as described by Equation (4). The ANN-Based Self-Organizing CFB Bed Height Dynamic Model 46 has five inputs, $PT_2(t)$, $F_C(t)$, $F_R(t)$, $F_D(t)$, $F_P(t)$ and one output $H_D(t)$.

Although $H_S(t)$ is the Steady-State Bed Height, it varies during normal operation because fuel flow, recycle flow, and disposal flow all affect the actual amount of the fuel inside the CFB furnace. Therefore, it is not a constant value. On the other hand, although $H_S(t)$ is calculated while the CFB is running, it is not the dynamic Bed Height. In fact, $H_S(t)$ should be equal to the Bed Height or Fuel Height if the CFB shuts down. To conclude, $H_S(t)$ reflects the amount of fuel and fuel density in the CFB furnace. A feature of the invention can convert $H_S(t)$ through Converter 48 to a targeted Bed Height $H_T(t)$, which can be used as the target value for the neural network training. $H_T(t)$ is defined and referenced herein using the above Target Variable term.

The Converter 48 can be designed based on energy or material balance calculations of the process or simply a ratio of the Converter input and output signals. Without losing generality, a ratio factor $b_1$ can be multiplied to convert the Steady-State Bed Height $H_S(t)$ to Bed Height Target Variable $H_T(t)$. Here $b_1$ is related to how much the Bed Height will increase when the fluidized bed is established from the CFB idle condition. For instance, if $H_S(t)$ is 2 meters, $b_1=3$, $H_T(t)=3*H_S(t)=6$ meters.

The Combiner and Switch 52 is a mechanism to either combine or select the Bed Height signals $H_D(t)$ and $H_T(t)$ to produce the final Soft-Sensor output H(t). For instance, when the dynamic model is still in its learning phase where $H_D(t)$ cannot be used, the estimated Target Variable $H_T(t)$ can be used as the Soft-Sensor output.

The variables in the block diagram of FIG. 7 are listed and described in Table 2.

TABLE 2

CFB Bed Height Soft-Sensor Variables

| Symbol | Name | Type | Note |
|---|---|---|---|
| $PT_1$ | Damper Delta P | Pre-measured | Based on Primary Air in different operating points. |
| $PT_2$ | Furnace Delta P | Measured | Using pressure sensors. |
| $PT_B$ | Bed Thickness Pressure Differential | Calculated | Based on Damper Delta P and Furnace Delta P |
| $H_0$ | Bed Height at Idle | Pre-measured | When CFB is idle. |
| $a_1$ | Coefficient a | Constant | Determined by experimentation. |
| $F_C$ | Coal Flow | Measured | Using flow sensors. |
| $F_R$ | Recycle Flow | Measured | Using flow sensors. |
| $F_D$ | Disposal Flow | Measured | Using flow sensors. |
| $F_P$ | Primary Air | Measured | Using sensors. |
| $H_S(t)$ | Bed Height at Steady-State | Calculated | The Bed Height that equals to fuel height when CFB is idle. |
| $H_T(t)$ | Bed Height, Target Variable | Calculated | The Bed Height Target Variable relating to $H_S(t)$. |
| $H_D(t)$ | Bed Height, Dynamic Model Output | Calculated | The Output of the Dynamic Model. |
| $e_M(t)$ | Model Error | Calculated | For ANN learning or training. |
| H(t) | Bed Height, Soft-Sensor Output | Calculated | Bed Height PV (Process Variable) for control. |
| $b_1$ | Coefficient b | Constant | Determined by experiments. |

In this case example, H(t) is the CFB Boiler Bed Height that is produced by the Self-Organizing Soft-Senor. Since controlling the CFB Bed Thickness or CFB Bed Height can achieve similar results, H(t) can be used as the Process Variable of Interest. By using H(t) as the measured process variable, the Bed Height can be automatically controlled, which can improve the safety and efficiency of the CFB Boiler. This method can have significant importance for controlling boilers in future energy plants that can deliver maximum-energy-efficiency, near-zero-emissions, fuel-flexibility, and multi-products.

ANN-Based Self-Organizing CFB Bed Height Dynamic Model

Figure 8:
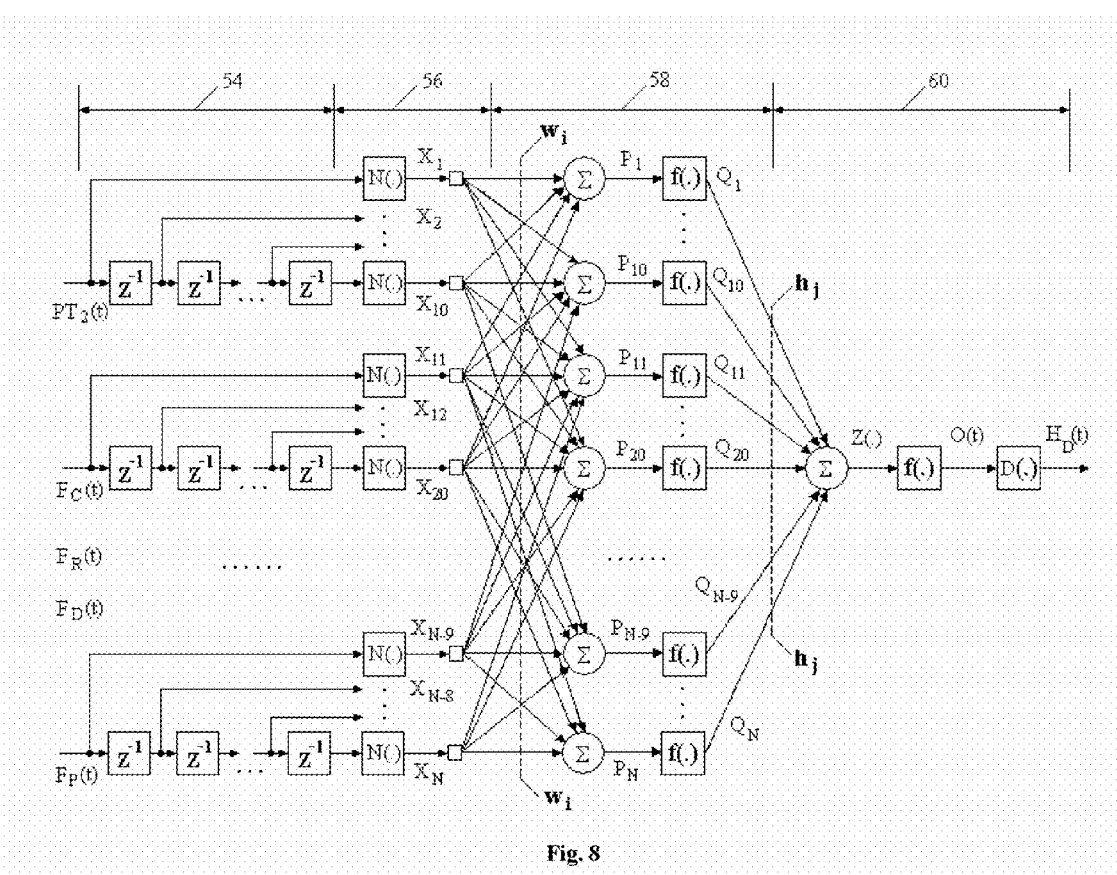
FIG. 8 is a block diagram illustrating an artificial neural network (ANN) based dynamic modeling mechanism as part of the Self-Organizing Soft-Sensor for the CFB Boiler Bed Height according to an embodiment of this invention.

FIG. 8 is a block diagram illustrating an artificial neural network (ANN) based dynamic modeling mechanism as part of the Self-Organizing Soft-Sensor for the CFB Boiler Bed Height according to an embodiment of this invention.

An objective for the CFB Bed Height Dynamic Model is to produce an output $H_D(t)$ that can track the given trajectory of its target variable $H_T(t)$ under process dynamic and operating condition changes. In other words, the dynamic modeling objective can be to minimize the model error $e_M(t)$ between the dynamic model output $H_D(t)$ and its target variable $H_T(t)$ in an online fashion.

$$e_M(t) = H_T(t) - H_D(t) \tag{5}$$

Then, the objective function for the CFB Bed Height Dynamic Model can be selected as follows:

$$E_M(t) = \frac{1}{2} e_m(t)^2 \tag{6}$$
$$= \frac{1}{2}[H_T(t) - H_D(t)]^2.$$

As shown in FIG. 8, the CFB Bed Height Dynamic Model comprises an input signal processing layer 54, a linear Perceptron multi-layer artificial neural network that has one input layer 56, one hidden layer with N neurons 58, and one output layer with one neuron 60. There are five input signals:

$PT_2(t)$—Furnace Delta P
$F_C(t)$—Coal Flow
$F_R(t)$—Recycle Flow
$F_D(t)$—Disposal Flow
$F_P(t)$—Primary Air In the input signal processing layer 54, each of the input signals passes iteratively through a series of delay units, where $z^{-1}$ denotes the unit delay operator. In computer real-time programming, this can correspond to digitizing of an analog signal at a pre-determined Sample Interval. As an example, the analog signal $PT_2(t)$ becomes a series of discrete signals $PT_2(1)$, $PT_2(2)$, ... $PT_2(i)$, where i denotes the ith sample. The digitization is based on a moving time interval and is carried out continuously. The moving time interval is called a temporal window. The number of discrete values saved and used in the temporal window is dependent on the number of neurons in the neural network design.

Without losing generality, ten discrete values are selected for each of the five input variables. Then, the input signal $PT_2(t)$ is digitized to a series of discrete signals $PT_2(1)$, $PT_2(2)$, ... $PT_2(10)$; $F_C(t)$ is digitized to $F_C(1)$, $F_C(2)$, ... $F_C(10)$, and so on. The numerical value 10 selected here is an example to describe the input signal processing mechanism 54. Other values can be used without departing from the spirit or scope of the invention.

At the ANN input layer 56, all the discrete signals enter the neural network in parallel. They go through a normalization function N(.), individually. Then, a set of normalized input signals $X_1$ to $X_N$ is generated as follows:

$$\begin{aligned}
X_1 &= N(PT_2(1)), \\
X_2 &= N(PT_2(2)), \\
&\cdots \\
X_{10} &= N(PT_2(10)), \\
X_{11} &= N(F_c(1)), \\
X_{12} &= N(F_c(2)), \\
&\cdots \\
X_{20} &= N(F_c(10)), \\
&\cdots \\
&\cdots \\
X_{N-9} &= N(F_p(1)), \\
X_{N-8} &= N(F_p(2)), \\
&\cdots \\
X_N &= N(F_p(10)),
\end{aligned} \tag{7}$$

where N=50 in this case example.

These delayed signals $X_i$, i=1, 2, ... N, are then conveyed to the hidden layer 58 through the neural network connections. This is equivalent to adding a feedback structure to the neural network. Accordingly, the regular static multilayer neural network becomes a dynamic neural network.

Then, each input signal is conveyed separately to each of the neurons in the hidden layer via a path weighted by an individual weighting factor $W_{ij}$, where i=1, 2, ... N, and j=1, 2, ... N. The inputs to each of the neurons in the hidden layer are summed by a set of adders to produce signal $P_j$. This signal $P_j$ is filtered by a set of activation functions f(.) to produce $Q_j$, where j=1, 2, ... N, which denotes the jth neuron in the hidden layer, and $Q_j$ is the output of the jth neuron in the hidden layer shown in FIG. 8.

A piecewise continuous linear function f(x) mapping real numbers to [0,1] is used as the activation function in the neural network as defined by $$f(x) = 0, \quad \text{if } x < -\frac{b}{a} \tag{8a}$$

$$f(x) = ax + b, \quad \text{if } -\frac{b}{a} \leq x \leq \frac{b}{a} \tag{8b}$$

$$f(x) = 1, \quad \text{if } x > \frac{b}{a} \tag{8c}$$

where a is an arbitrary constant and b=1/2.

Each output signal from the hidden layer is conveyed to the single neuron in the output layer 60 via a path weighted by an individual weighting factor $h_j$, where j=1, 2, ... N. These signals are summed in a set of adders to produce signal Z(.), and then filtered by activation function f(.) to produce the output O(.) of the neural network with a range of 0 to 1.

A de-normalization function defined by $$D(x) = 100x, \tag{9}$$

maps the O(.) signal back into the real space to produce the output $H_D(t)$.

An algorithm governing the input-output of the neural network dynamic model consists of the following difference equations:

$$P_j(n) = \sum_{i=1}^{N} w_{ij}(n)X_i(n), \quad (10)$$

$$Q_j(n) = f(P_j(n)), \quad (11)$$

$$O(n) = f\left(\sum_{j=1}^{N} h_j(n)Q_j(n)\right), \quad (12)$$

$$= a\sum_{j=1}^{N} h_j(n)Q_j(n) + b,$$

when the variable of function f(.) is in the range specified in Equation (8b), and O(n) is bounded by the limits specified in Equations (8a) and (8c).

The dynamic model output becomes $$H_D(t) = D(O(t)) \quad (13)$$

$$= 100\left[a\sum_{j=1}^{N} h_j(n)Q_j(n) + b\right],$$

where n denotes the nth iteration; O(t) is the continuous function of O(n); and D(.) is the de-normalization function.

The minimization of objective function $E_M(t)$ is performed by adjusting the weighting factors in artificial neural networks. An online learning algorithm is developed to continuously update the values of the weighting factors of the neural network as follows:

$$\Delta w_{ij}(n) = a^2 \eta e_M(n) X_i(n) h_j(n), \quad (14)$$

$$\Delta h_j(n) = a \eta e_M(n) Q_j(n). \quad (15)$$

where $\eta>0$ is the learning rate, $e_M(n)$ is the discrete signal of model error $e_M(t)$, a is a constant in Eqn (8), and $X_i(n)$ is the ith input signal.

The dynamic model algorithm can be implemented in computer software to perform real-time computation for real applications.

D. Self-Organizing Sensor (SOS) for a Process Variable

Figure 9:
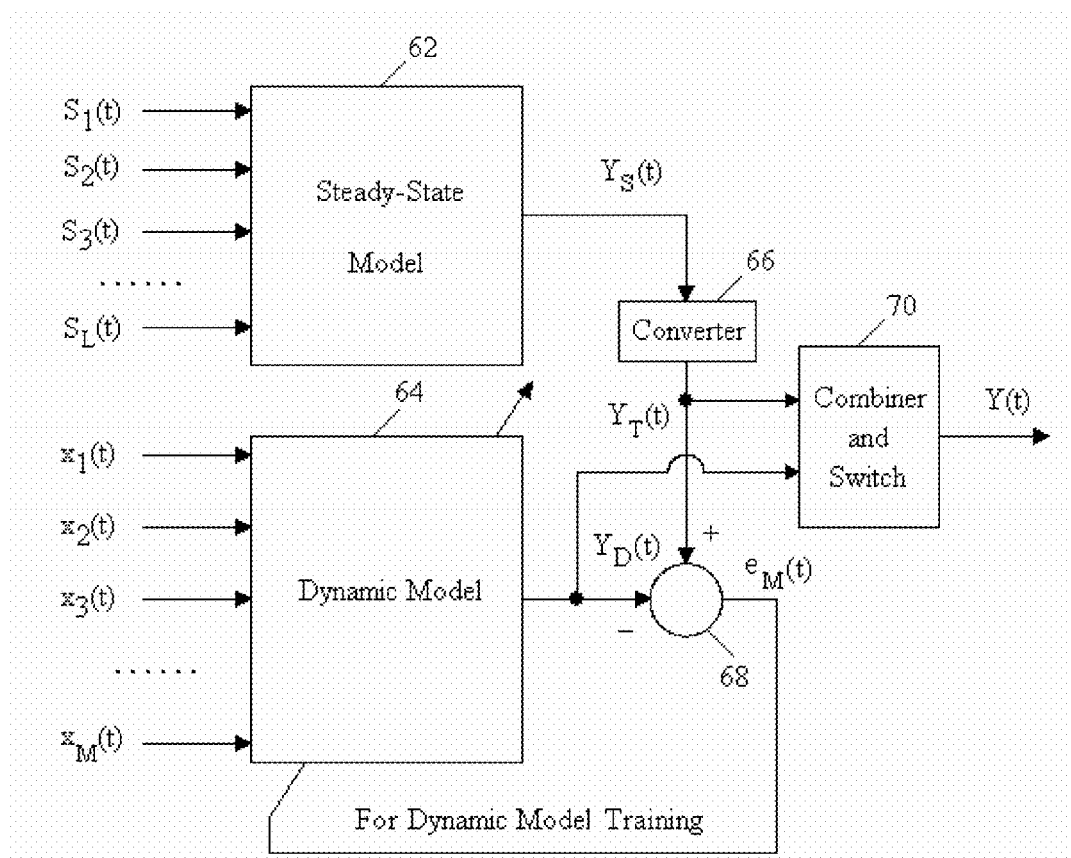
FIG. 9 is a block diagram illustrating a Self-Organizing Sensor for a process variable with one or multiple input variables according to an embodiment of this invention.

FIG. 9 is a block diagram illustrating a Self-Organizing Sensor for a process variable with one or multiple input variables according to an embodiment of this invention. The Self-Organizing Sensor is shown comprising a Steady-State Model 62, a Dynamic Model 64, a Converter 66, an Adder 68, and a Combiner and Switch 70.

The Steady-State Model 62 has inputs, $S_1(t), S_2(t), \ldots, S_L(t)$, where L is the number of input variables or parameters. The inputs for the Steady-State Model can be in any one or more of the following forms:

Process variables measured online from the process directly,

Process variables or other information from the sensor networks,

Internal variables or parameters of the SOS, and

Parameters set from a computer or device.

The Steady-State Model 62 produces an output $Y_S(t)$, which is a function of the inputs $S_1(t), S_2(t), \ldots, S_L(t)$ as follows:

$$Y_S(t) = F_S[S_1(t), S_2(t), \ldots, S_L(t)], \quad (16)$$

where L is the number of input variables or parameters, and $F_S[.]$ is a function that describes the input and output relationship of the Steady-State Model. This function can be as simple as a linear function or a complicated multi-variable dynamical equation. In the CFB Boiler Bed Height example, the Steady-State model output can be calculated based on the following formula:

$$H_S(t) = a_1 * PT_B + H_0. \quad (17)$$

Therefore, the function $F_S[.]$ in this case is a linear function.

The Dynamic Model 64 can be implemented using a mechanism such as an artificial neural network (ANN) that has dynamic modeling capabilities. It has inputs, $x_1(t), x_2(t), \ldots, x_M(t)$, where M is the number of input variables. The inputs for the Dynamic Model are process variables measured online from the process directly or from the sensor networks.

The objective for the Dynamic Model is to produce an output $Y_D(t)$ that can track the given trajectory of its target variable $Y_T(t)$ under process dynamic and operating condition changes. In other words, the dynamic modeling objective is to minimize the model error $e_M(t)$ between the dynamic model output $Y_D(t)$ and its target variable $Y_T(t)$ in an online fashion.

$$e_M(t) = Y_T(t) - Y_D(t) \quad (18)$$

An objective function for the Dynamic Model can be selected as follows:

$$E_M(t) = \frac{1}{2}e_M(t)^2 \quad (19)$$

$$= \frac{1}{2}[Y_T(t) - Y_D(t)]^2.$$

Figure 10:
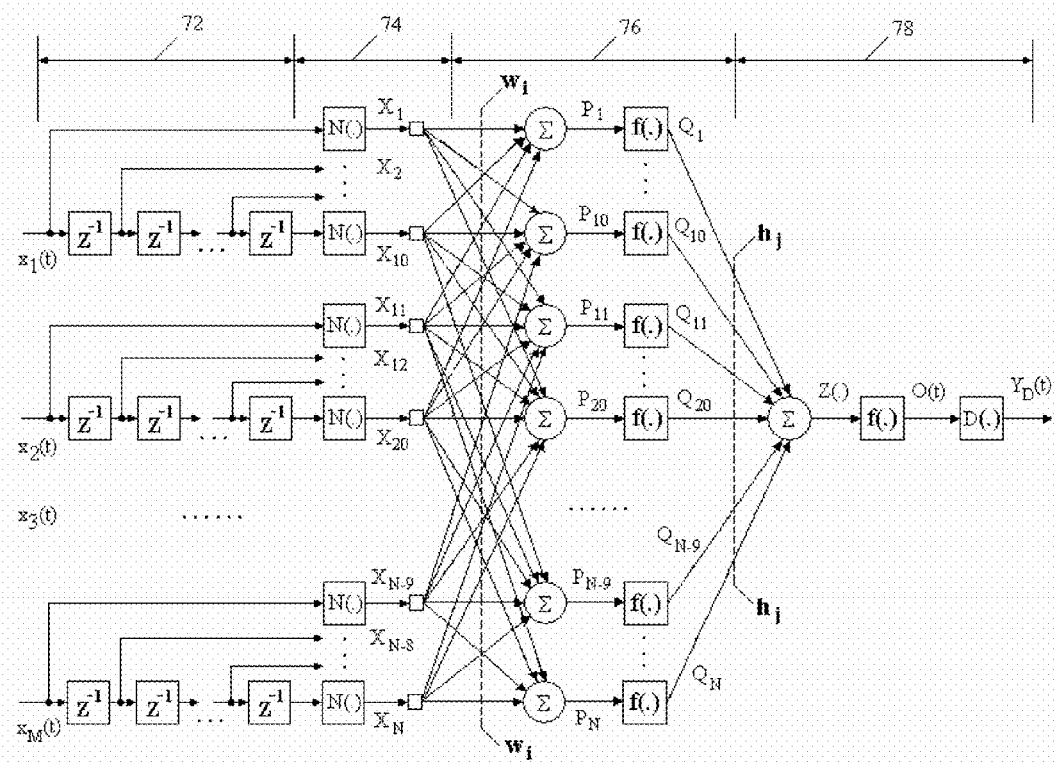
FIG. 10 is a block diagram illustrating an artificial neural network (ANN) based dynamic modeling mechanism as part of the Self-Organizing Sensor for a process variable according to an embodiment of this invention.

FIG. 10 is a block diagram illustrating an artificial neural network (ANN) based dynamic modeling mechanism as part of the Self-Organizing Soft-Sensor for a process variable according to an embodiment of this invention.

As shown in FIG. 10, the Dynamic Model comprises an input signal processing layer 72, a linear Perceptron multi-layer artificial neural network that has one input layer 74, one hidden layer with N neurons 76, and one output layer with one neuron 78.

There are M input signals, $x_1(t), x_2(t), \ldots x_M(t)$, where M=1, 2, 3, . . . , as an integer. In the input signal processing layer 72, each of the input signals moves iteratively through a series of delay units, where $z^{-1}$ denotes the unit delay operator. In computer real-time programming, this can correspond to digitizing of an analog signal at a pre-determined Sample Interval. As an example, the analog signal $x_1(t)$ becomes a series of discrete signals $x_1(1), x_1(2), \ldots x_1(i)$, where i denotes the ith sample. The digitization is based on a moving time interval and is carried out continuously. The moving time interval is called a temporal window. The number of discrete values saved and used in the temporal window is dependent on the number of neurons in the neural network design.

If the number of discrete values is represented by I for each of the M input variables, the input signal $x_1(t)$ is digitized to a series of discrete signals $x_1(1), x_1(2), \ldots x_1(I)$; $x_2(t)$ is digitized to $x_2(1), x_2(2), \ldots x_2(I); \ldots$, and $x_M(t)$ is digitized to $x_M(1), x_M(2), \ldots x_M(I)$. Without losing generality, I=10 can be selected to describe the input signal processing mechanism 72. Other values can be used without departing from the spirit or scope of the invention.

At the ANN input layer 74, all the discrete signals enter the neural network in parallel. They go through a normalization function N(.), individually. Then, a set of normalized input signals $X_1$ to $X_N$ is generated.

$$X_1 = N(x_1(1)), \quad (20)$$
$$X_2 = N(x_1(2)),$$
$$\ldots\ldots$$
$$X_{10} = N(x_1(10)),$$
$$X_{11} = N(x_2(1)),$$
$$X_{12} = N(x_2(2)),$$
$$\ldots\ldots$$
$$X_{20} = N(x_2(10)),$$
$$\ldots\ldots$$
$$\ldots\ldots$$
$$X_{N-9} = N(x_M(1)),$$
$$X_{N-8} = N(x_M(2)),$$
$$\ldots\ldots$$
$$X_N = N(x_M(10)),$$

where N=1, 2, 3, . . . , as an integer. If 10 discrete values are selected for digitizing the continuous variable, N=10*M, where M is the number of input variables, and N is the number of neurons in the ANN input layer.

These delayed signals $X_i$, i=1, . . . N, are then conveyed to the hidden layer 76 through the neural network connections. This is equivalent to adding a feedback structure to the neural network, whereby the regular static multilayer neural network becomes a dynamic neural network.

Next, each input signal is conveyed separately to each of the neurons in the hidden layer via a path weighted by an individual weighting factor $W_{ij}$, where i=1, 2, . . . N, and j=1, 2, . . . N. The inputs to each of the neurons in the hidden layer are summed by a set of adders to produce signal $P_j$. This signal $P_j$ is filtered by a set of activation functions f(.) to produce $Q_j$, where j=1, 2, . . . N, which denotes the jth neuron in the hidden layer, and $Q_j$ is the output of the jth neuron in the hidden layer shown in FIG. 10.

A piecewise continuous linear function $f(x)$ mapping real numbers to [0,1] is used as the activation function in the neural network as defined by $$f(x) = 0, \text{ if } x < -\frac{b}{a} \quad (21a)$$

$$f(x) = ax + b, \text{ if } -\frac{b}{a} \leq x \leq \frac{b}{a} \quad (21b)$$

$$f(x) = 1, \text{ if } x < \frac{b}{a} \quad (21c)$$

where a is an arbitrary constant and b=1/2.

Each output signal from the hidden layer is conveyed to the single neuron in the output layer 78 via a path weighted by an individual weighting factor $h_j$, where j=1, 2, . . . N. These signals are summed in a set of adders to produce signal Z(.), and then filtered by activation function f(.) to produce the output O(.) of the neural network with a range of 0 to 1.

A de-normalization function defined by $$D(x) = 100x, \quad (22)$$

maps the O(.) signal back into the real space to produce the output $Y_D(t)$.

An algorithm governing the input-output of the neural network dynamic model can consist of the following difference equations:

$$P_j(n) = \sum_{i=1}^{N} w_{ij}(n) X_i(n), \quad (23)$$

$$Q_j(n) = f(P_j(n)), \quad (24)$$

$$O(n) = f\left(\sum_{j=1}^{N} h_j(n) Q_j(n)\right), \quad (25)$$

$$= a \sum_{j=1}^{N} h_j(n) Q_j(n) + b,$$

when the variable of function f(.) is in the range specified in Equation (21b), and O(n) is bounded by the limits specified in Equations (21a) and (21c).

The dynamic model output becomes $$Y_D(t) = D(O(t)) \quad (26)$$

$$= 100 \left[ a \sum_{j=1}^{N} h_j(n) Q_j(n) + b \right],$$

where n denotes the nth iteration; O(t) is the continuous function of O(n); and D(.) is the de-normalization function.

The minimization of objective function $E_M(t)$ can be accomplished by adjusting the weighting factors in artificial neural networks. An online learning algorithm is developed to continuously update the values of the weighting factors of the neural network as follows:

$$\Delta w_{ij}(n) = a^2 \eta e_M(n) X_i(n) h_j(n), \quad (27)$$

$$\Delta h_j(n) = a \eta e_M(n) Q_j(n). \quad (28)$$

where $\eta > 0$ is the learning rate, $e_M(n)$ is the discrete signal of model error $e_M(t)$, a is a constant in Eqn (21), and $X_i(n)$ is the ith input signal.

The dynamic model algorithm can be implemented in computer software to perform real-time computation for real-world applications.

E. Self-Organizing Sensor Development Method

In accordance with an aspect of the invention, a method of developing a Self-Organizing Sensor can comprise one or more of determining a relationship between (i) a variable of interest in a system at steady-state and (ii) one or more variables of the system that can be predetermined or pre-measured in the steady-state, converting the variable of interest to a target variable, producing a dynamic model output based on the target variable, training the dynamic model, and combining or selecting the dynamic model output and the target variable to produce a final Self-Organizing Sensor output. The training can be designed to minimize a difference between the dynamic model output and the target variable. Also, or alternatively, the training can be followed by determining (e.g., based upon a model error and/or the convergence of weighting factors of the dynamic model) whether the dynamic model is still in its learning phase. Various permutations of the above, as well as modifications and/or combinations with any of the below features, as would be evident or suggested to one skilled in the art in view of this disclosure, are intended to be encompassed by the method.

One implementation of the method is provided below with the understanding that such can be modified, rearranged, or tailored to encompass versions of a plurality, or preferably all, of the following:

1. Select or determine a variable $Y_S(t)$ that is the Process Variable of Interest or related to the Process Variable of Interest at Steady-State Condition. In the CFB boiler case example, the Variable of Interest is the CFB Bed Thickness or the CFB Bed Height. $Y_S(t)$ is CFB Bed Height at Steady-State Condition.

2. Derive a formula to calculate $Y_S(t)$ based on one or multiple variables or parameters that can be pre-measured in the steady-state of the process, or determined through experimentation, or entered manually.

3. Convert the variable $Y_S(t)$ to a Target Variable $Y_T(t)$ of the Process Variable of Interest. The Converter can be designed based on energy and material balance calculations of the process or simply a ratio of the input and output signals of the Converter.

4. Use a dynamic modeling mechanism such as but not limited to an artificial neural network (ANN) based dynamic modeling mechanism to produce a dynamic model output $Y_D(t)$ based on the Target Variable $Y_T(t)$.

5. Train the dynamic model based on minimizing the model error $e_M(t)$ which is the difference between the dynamic model output $Y_D(t)$ and the Target Variable $Y_T(t)$.

6. Judge the amplitude of the model error $e_M(t)$ and the convergence of the weighting factors of the dynamic model to determine if the dynamic model is still in its learning phase or not.

7. Implement a Combiner and Switch mechanism to either combine or select $Y_D(t)$ and $Y_T(t)$ to produce the final Self-Organizing Sensor output $Y(t)$. If the dynamic model is still in its learning phase where $Y_D(t)$ cannot be used, use the estimated Target Variable $Y_T(t)$ as the Self-Organizing Sensor output.

8. If the dynamic model has finished its learning phase where dynamic model output $Y_D(t)$ can be used to represent the dynamics of the Process Variable of Interest, use the $Y_D(t)$ as the Self-Organizing Sensor output.

The invention claimed is:

1. A self-organizing sensor (SOS) for estimating a process variable of interest in a physical process, comprising:
 a) a steady-state model, including:
  i) a plurality of inputs, $S_1(t), S_2(t), \ldots, S_L(t)$, wherein L is the number of input variables or parameters, and
  ii) an output $Y_S(t)$, which is a function of the inputs $S_1(t), S_2(t), \ldots, S_L(t)$ in the following form:

$$Y_S(t) = F_S[S_1(t), S_2(t), \ldots, S_L(t)],$$

wherein $F_S[.]$ is a function that describes the input and output relationship of the steady-state model;
 b) a dynamic model, including:
  i) a plurality of inputs, $x_1(t), x_2(t), \ldots, x_M(t)$, wherein M is the number of input variables, and
  ii) an output $Y_D(t)$ that tracks the given trajectory of its target variable $Y_T(t)$ under process dynamic and operating condition changes;
 c) a converter that converts the output $Y_S(t)$ of the steady-state model to the target variable $Y_T(t)$;
 d) an adder that implements the following function:

$$e_M(t) = Y_T(t) - Y_D(t);$$

e) an objective function for the dynamic model that is in the following form:

$$E_M(t) = \frac{1}{2} e_M(t)^2$$
$$= \frac{1}{2}[Y_T(t) - Y_D(t)]^2;$$

and
 f) a combiner and switch mechanism that combines or selects the signals $Y_D(t)$ and $Y_T(t)$ to produce the final Soft-Sensor output $Y(t)$;
 wherein the inputs of the steady-state model are in one or more of the following forms:
  i) process variables measured online from the process directly,
  ii) process variables or other information from the sensor networks,
  iii) internal variables or parameters of the SOS, and
  iv) parameters set from a computer or device.

2. The self-organizing sensor (SOS) of claim 1, wherein the dynamic model is an artificial neural network (ANN), comprising:
 a) an input signal processing layer, having a plurality of input signals $x_1(t), x_2(t), \ldots, x_M(t)$, wherein M=1, 2, 3, ..., as an integer, whereby each of the input signals moves iteratively through a series of delay units so that a set of normalized input signals $X_1$ to $X_N$ is generated in the following form:

$$X_1 = N(x_1(1)),$$
$$X_2 = N(x_1(2)),$$
$$\ldots \ldots$$
$$X_{10} = N(x_1(10)),$$
$$X_{11} = N(x_2(1)),$$
$$X_{12} = N(x_2(2)),$$
$$\ldots \ldots$$
$$X_{20} = N(x_2(10)),$$
$$\ldots \ldots$$
$$\ldots \ldots$$
$$X_{N-9} = N(x_M(1)),$$
$$X_{N-8} = N(x_M(2)),$$
$$\ldots \ldots$$
$$X_N = N(x_M(10)),$$

wherein N=1, 2, 3, ..., as an integer, and N(.) denotes the normalization function;
 b) a hidden layer with N neurons, wherein each input signal is conveyed separately to each of the neurons in the hidden layer via a path weighted by an individual weighting factor $W_{ij}$, where i=1, 2, ... N, and j=1, 2, ... N, and the inputs to each of the neurons in the hidden layer are summed by a set of adders to produce signal $P_j$, which is further filtered by a set of activation functions f(.) to produce $Q_j$, wherein j=1, 2, ... N, which denotes the jth neuron in the hidden layer;

c) a piecewise continuous linear function $f(x)$ mapping real numbers to [0,1] used as the activation function in the neural network as defined by $$f(x) = 0, \text{ if } x < -\frac{b}{a}$$

$$f(x) = ax + b, \text{ if } -\frac{b}{a} \leq x \leq \frac{b}{a}$$

$$f(x) = 1, \text{ if } x > \frac{b}{a}$$

where a is an arbitrary constant and b=1/2;

d) an output layer with one neuron, wherein each output signal from the hidden layer is conveyed to the single neuron in the output layer via a path weighted by an individual weighting factor $h_j$, where j=1, 2, ... N;

e) an output signal $Y_D(t)$ generated by the ANN based on the following difference equations:

$$P_j(n) = \sum_{i=1}^{N} w_{ij}(n) X_i(n),$$

$$Q_j(n) = f(P_j(n)),$$

$$O(n) = f\left(\sum_{j=1}^{N} h_j(n) Q_j(n)\right)$$

$$= a \sum_{j=1}^{N} h_j(n) Q_j(n) + b,$$

$$Y_D(t) = 100 \left[ a \sum_{j=1}^{N} h_j(n) Q_j(n) + b \right],$$

wherein n denotes the nth iteration, O(t) is the continuous function of O(n), and D(.) is a de-normalization function; and f) a mechanism to minimize the objective function $E_M(t)$ by adjusting the weighting factors in the artificial neural networks in the following form:

$$\Delta w_{ij}(n) = a^2 \eta e_M(n) X_i(n) h_j(n),$$

$$\Delta h_j(n) = a \eta e_M(n) Q_j(n),$$

wherein $\eta > 0$ is the learning rate, $e_M(n)$ is the discrete signal of model error $e_M(t)$, a is a constant, and $X_i(n)$ is the ith input signal.

3. The self-organizing sensor (SOS) of claim 1, in which the self-organizing sensor (SOS) is a CFB bed height self-organizing sensor for estimating the bed height of a circulating fluidized-bed (CFB) boiler, comprising:

a) a process variable $PT_B$ that is the bed thickness pressure differential, which is calculated in the following form:

$$PT_B = PT_2 - PT_1,$$

wherein $PT_1$ is Damper Delta P and $PT_2$ is Furnace Delta P of the CFB boiler, which are estimated in the idle or steady-state condition of the CFB boiler through experimentation;

b) a steady-state model, including:
i) a plurality of inputs: $PT_1(t)$, $PT_2(t)$, $H_0$, and a1, wherein $PT_1$ is Damper Delta P, $PT_2$ is Furnace Delta P, $H_0$ is Bed Height at $PT_B = 0$, and a1 is a constant found in the steady-state through experimentation;

ii) an output $H_S(t)$, which is calculated in the following form:

$$H_S(t) = a_1 * PT_B + H_0;$$

c) a dynamic model, including:
i) a plurality of inputs: $PT_2(t)$, $F_C(t)$, $F_R(t)$, $F_D(t)$, $F_P(t)$; wherein $PT_2(t)$ is Furnace Delta P, $F_C(t)$ is Coal Flow, $F_R(t)$ is Recycle Flow, $F_D(t)$ is Disposal Flow, and $F_P(t)$ is Primary Air of the CFB boiler;

ii) an output $H_D(t)$ that tracks the given trajectory of its target variable $H_T(t)$ under process dynamic and operating condition changes;

d) a converter that converts the output $H_S(t)$ of the steady-state model to the target variable $H_T(t)$;

e) an adder that implements the following function:

$$e_M(t) = H_T(t) - H_D(t);$$

f) an objective function for the dynamic model in the following from:

$$E_M(t) = \frac{1}{2} e_M(t)^2$$

$$= \frac{1}{2} [H_T(t) - H_D(t)]^2;$$

and g) a combiner and switch mechanism that either combines or selects the signals $H_D(t)$ and $H_T(t)$ to produce the final soft-sensor output H(t).

4. The CFB bed height self-organizing sensor of claim 3, wherein the dynamic model is an artificial neural network (ANN), comprising:

a) an input signal processing layer, including a plurality of input signals $x_1(t)$, $x_2(t)$, ..., $x_M(t)$, wherein M=1, 2, 3, ..., as an integer, each of the input signals moves iteratively through a series of delay units so that a set of normalized input signals $X_1$ to $X_N$ is generated in the following form:

$$X_1 = N(PT_2(1)),$$

$$X_2 = N(PT_2(2)),$$

......

$$X_{10} = N(PT_2(10)),$$

$$X_{11} = N(F_c(1)),$$

$$X_{12} = N(F_c(2)),$$

......

$$X_{20} = N(F_c(10)),$$

......

......

$$X_{N-9} = N(F_P(1)),$$

$$X_{N-8} = N(F_P(2)),$$

......

$$X_N = N(F_P(10)),$$

wherein N=1, 2, 3, ... 49, 50 as an integer, and N(.) denotes the normalization function;

b) a hidden layer with N neurons, wherein each input signal is conveyed separately to each of the neurons in the hidden layer via a path weighted by an individual weighting factor $W_{ij}$, where i=1, 2, . . . N, and j=1, 2, . . . N, and the inputs to each of the neurons in the hidden layer are summed by a set of adders to produce signal $P_j$, which is further filtered by a set of activation functions f(.) to produce $Q_j$, wherein j=1, 2, N, which denotes the jth neuron in the hidden layer;

c) a piecewise continuous linear function $f(x)$ mapping real numbers to [0,1] being used as the activation function in the neural network as defined by $$f(x) = 0, \text{ if } x < -\frac{b}{a}$$

$$f(x) = ax + b, \text{ if } -\frac{b}{a} \leq x \leq \frac{b}{a}$$

$$f(x) = 1, \text{ if } x > \frac{b}{a}$$

where a is an arbitrary constant and b=1/2;

d) an output layer with one neuron, wherein each output signal from the hidden layer is conveyed to the single neuron in the output layer via a path weighted by an individual weighting factor $h_j$, where j=1, 2, . . . N; and e) an output signal $H_D(t)$ generated by the ANN based on the following difference equations:

$$P_j(n) = \sum_{i=1}^{N} w_{ij}(n) X_i(n),$$

$$Q_j(n) = f(P_j(n)),$$

$$O(n) = f\left(\sum_{j=1}^{N} h_j(n) Q_j(n)\right)$$

$$= a \sum_{j=1}^{N} h_j(n) Q_j(n) + b,$$

$$H_D(t) = 100 \left[ a \sum_{j=1}^{N} h_j(n) Q_j(n) + b \right],$$

wherein n denotes the nth iteration, O(t) is the continuous function of O(n), and D(.) is a de-normalization function.

5. The CFB bed height self-organizing sensor of claim 4, wherein the minimization of the objective function $E_M(t)$ is accomplished by adjusting the weighting factors in the artificial neural networks (ANN) in the following form:

$$\Delta w_{ij}(n) = a^2 \eta e_M(n) X_i(n) h_j(n),$$

$$\Delta h_j(n) = a \eta e_M(n) Q_j(n),$$

wherein $\eta > 0$ is the learning rate, $e_M(n)$ is the discrete signal of model error $e_M(t)$, a is a constant, and $X_i(n)$ is the ith input signal.

* * * * *